United States Patent
Nunn et al.

(10) Patent No.: US 12,010,152 B2
(45) Date of Patent: Jun. 11, 2024

(54) INFORMATION SECURITY SYSTEMS AND METHODS FOR CYBER THREAT EVENT PREDICTION AND MITIGATION

(71) Applicant: BANK OF AMERICA CORPORATION, Charlotte, NC (US)

(72) Inventors: Daniel John Nunn, Berkshire (GB); Sheenagh Alice Meghen, Camberley (GB)

(73) Assignee: Bank of America Corporation, Charlotte, NC (US)

( * ) Notice: Subject to any disclaimer, the term of this patent is extended or adjusted under 35 U.S.C. 154(b) by 274 days.

(21) Appl. No.: 17/643,407

(22) Filed: Dec. 8, 2021

(65) Prior Publication Data

US 2023/0179637 A1 Jun. 8, 2023

(51) Int. Cl.
*H04L 9/40* (2022.01)
(52) U.S. Cl.
CPC ........ *H04L 63/205* (2013.01); *H04L 63/0227* (2013.01); *H04L 63/0236* (2013.01); *H04L 63/1433* (2013.01); *H04L 63/1458* (2013.01)
(58) Field of Classification Search
CPC ............... H04L 63/205; H04L 63/0227; H04L 63/0236; H04L 63/1433; H04L 63/1458
See application file for complete search history.

(56) References Cited

U.S. PATENT DOCUMENTS

| | | |
|---|---|---|
| 6,742,128 B1 | 5/2004 | Joiner |
| 6,839,850 B1 | 1/2005 | Campbell et al. |
| 7,530,105 B2 | 5/2009 | Gilbert et al. |
| 8,191,149 B2 | 5/2012 | Yun et al. |
| 8,627,479 B2 | 1/2014 | Wittenstein et al. |
| 8,756,684 B2 | 6/2014 | Frantz et al. |
| 8,955,111 B2 | 2/2015 | Glew et al. |
| 9,185,124 B2 | 11/2015 | Chakraborty |
| 9,210,181 B1 | 12/2015 | Nandy et al. |
| 9,256,735 B2 | 2/2016 | Stute |
| 9,292,695 B1 | 3/2016 | Bassett |
| 9,298,918 B2 | 3/2016 | Glew et al. |
| 9,438,614 B2 | 9/2016 | Herz |
| 9,443,085 B2 | 9/2016 | Glew et al. |
| 9,460,290 B2 | 10/2016 | Glew et al. |
| 9,503,472 B2 | 11/2016 | Laidlaw et al. |
| 9,519,781 B2 | 12/2016 | Golshan et al. |
| 9,648,039 B1 | 5/2017 | Lipinski et al. |
| 9,686,293 B2 | 6/2017 | Golshan et al. |
| 9,792,430 B2 | 10/2017 | Golshan et al. |

(Continued)

*Primary Examiner* — Techane Gergiso

(57) ABSTRACT

A method for automatically adjusting one or more device security settings includes receiving a plurality of information feeds received over a communications network from a plurality of information sources. The method further includes accessing a particular information feed from the plurality of information feeds and accessing a predefined trigger associated with the particular information feed. The method further includes determining, by comparing the particular information feed with the predefined trigger, whether a security event is predicted to occur. When the security event is predicted to occur, the method generates an alert for display on a user device and sends, over the communications network, one or more instructions to adjust the one or more device security settings.

17 Claims, 2 Drawing Sheets

(56) References Cited

U.S. PATENT DOCUMENTS

| | | |
|---|---|---|
| 9,800,605 B2 | 10/2017 | Baikalov et al. |
| 9,805,311 B1 | 10/2017 | Mohler |
| 9,836,600 B2 | 12/2017 | Herwono et al. |
| 10,063,581 B1 | 8/2018 | Averbuch et al. |
| 10,078,752 B2 | 9/2018 | Berg et al. |
| 10,326,778 B2 | 6/2019 | Gong et al. |
| 10,356,109 B2 | 7/2019 | Singla et al. |
| 10,397,246 B2 | 8/2019 | Raff et al. |
| 10,432,660 B2 | 10/2019 | Crabtree et al. |
| 10,476,896 B2 | 11/2019 | DiValentin et al. |
| 10,587,640 B2 | 3/2020 | Steelman et al. |
| 10,594,714 B2 | 3/2020 | Crabtree et al. |
| 10,609,079 B2 | 3/2020 | Crabtree et al. |
| 10,681,074 B2 | 6/2020 | Crabtree et al. |
| 10,778,713 B2 | 9/2020 | Zeng et al. |
| 11,025,674 B2 | 6/2021 | Crabtree et al. |
| 11,089,045 B2 | 8/2021 | Crabtree et al. |
| 2004/0064731 A1 | 4/2004 | Nguyen et al. |
| 2007/0300296 A1* | 12/2007 | Kudla ................. H04L 63/0263 726/13 |
| 2011/0185421 A1 | 7/2011 | Wittenstein et al. |
| 2014/0259095 A1 | 9/2014 | Bryant |
| 2016/0044054 A1* | 2/2016 | Stiansen ............. H04L 63/1416 726/24 |
| 2016/0078365 A1 | 3/2016 | Baumard |
| 2016/0300227 A1* | 10/2016 | Subhedar ............. G06Q 20/384 |
| 2017/0063920 A1* | 3/2017 | Thomas ............. H04L 63/1416 |
| 2017/0346851 A1* | 11/2017 | Drake .................... H04L 9/0838 |
| 2018/0255077 A1 | 9/2018 | Paine |
| 2018/0270265 A1 | 9/2018 | Sage |
| 2019/0124112 A1* | 4/2019 | Thomas .................. H04L 63/20 |
| 2019/0251260 A1 | 8/2019 | Stockdale et al. |
| 2019/0260793 A1 | 8/2019 | Stockdale et al. |
| 2019/0342307 A1 | 11/2019 | Gamble et al. |
| 2019/0373005 A1 | 12/2019 | Bassett |
| 2020/0162255 A1* | 5/2020 | Hunt ..................... H04L 63/083 |
| 2020/0163605 A1 | 5/2020 | Valacich et al. |
| 2021/0092150 A1 | 3/2021 | Crabtree et al. |
| 2021/0243595 A1* | 8/2021 | Buck .................... H04W 12/088 |
| 2021/0297452 A1 | 9/2021 | Crabtree et al. |
| 2021/0312400 A1* | 10/2021 | Irimie ................. H04L 63/1416 |
| 2022/0158999 A1* | 5/2022 | Kaidi ................. H04L 63/0823 |

* cited by examiner

INFORMATION SECURITY SYSTEMS AND METHODS FOR CYBER THREAT EVENT PREDICTION AND MITIGATION

TECHNICAL FIELD

The present disclosure relates generally to information security, and more specifically to information security systems and methods for cyber threat event prediction and mitigation.

BACKGROUND

The cyber security landscape moves quickly, unpredictably, and often times only after milestone incidents. The ability to respond dynamically to shifts in cyber threats or attacks is inversely proportionate to the scale of the organisation seeking to address the issue. Typically, large companies are unable to shift their defensive postures rapidly enough to address emerging cyber threats or attacks.

SUMMARY

The cyber security landscape moves quickly, unpredictably, and often times only after milestone incidents. The ability to respond dynamically to shifts in cyber threats or attacks is inversely proportionate to the scale of the organisation seeking to address the issue. Typically, large companies are unable to shift their defensive postures rapidly enough to address emerging cyber threats or attacks.

To address these and other problems with existing cyber security systems and methods, this disclosure contemplates a framework for automatically and continuously monitoring real world events (e.g., social media postings, crypto currency prices, etc.) for actions that may prompt, cause, or provoke malicious cyber attacks on an organization's computer systems. Once a real-world event is detected that is likely to provoke a cyber attack, the disclosed embodiments automatically adjust device security settings to mitigate the predicted cyber attack and send one or more alerts to notify security personnel about the predicted cyber attack. For example, the disclosed embodiments may monitor a social media feed (e.g., a Twitter feed) of a prominent politician for the mention of a specific country or actor. Once detected, embodiments may proactively adjust device security settings to mitigate the risk of a possible future cyber attack from the identified country or actor. As a specific example, one or more security settings may be automatically adjusted on a network device (e.g., a router) to block network traffic originating from a specific geographic region associated with the identified country or actor (i.e., geoblocking). As a result, the organization's computer systems may be protected from the predicted cyber attack and security personnel may have advanced notice about the predicted cyber attack.

In one embodiment, a method for automatically adjusting one or more device security settings includes receiving a plurality of information feeds over a communications network from a plurality of information sources. The method further includes accessing a particular information feed from the plurality of information feeds and accessing a predefined trigger associated with the particular information feed, each predefined trigger comprising criteria for evaluating one or more of the plurality of information feeds for possible security events. The method further includes determining, by comparing the particular information feed with criteria of the predefined trigger, whether a security event is predicted to occur. When the security event is predicted to occur, the method generates an alert for display on a user device and sends, over the communications network, one or more instructions to adjust the one or more device security settings in order to prevent or mitigate the predicted security event.

A practical application of the systems and methods described herein is that a cyber security system may be able to predict and take automatic actions in one or more computer systems to mitigate a future cyber event rather than merely reacting to a cyber event that has already occurred. In this manner, computing resources (e.g., processor, memory, and/or network resources) are not wasted handling network traffic and operations that are typical when experiencing cyber attacks. By reducing or eliminating altogether network operations and traffic associated with cyber attacks, data loss may also be reduced, thereby improving the efficiency of computing systems. In addition, resources such as electricity may be preserved by preventing the additional computing resources typically associated with cyber attacks.

Embodiments of the present disclosure provide technological solutions to technological problems. For example, the disclosed embodiments automatically send instructions to adjust certain security settings of a device when a security event (e.g., a cyber attack) is predicted to occur. As a specific example, one or more security settings may be automatically adjusted on a network device (e.g., a router) to block network traffic originating from a specific geographic region associated with a predicted cyber attack. As a result, the organization's computer systems may be protected from the predicted cyber attack. This conserves computing recourses such as processing power and memory that is typically required when experiencing a cyber attack. Furthermore, network bandwidth may be conserved by avoiding the overwhelming network traffic that is typical of some cyber attacks (e.g., denial of service attacks). Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The cyber security landscape moves quickly, unpredictably, and often times only after milestone incidents. The ability to respond dynamically to shifts in cyber threats or attacks is inversely proportionate to the scale of the organisation seeking to address the issue. Typically, large companies are unable to shift their defensive postures rapidly enough to address emerging cyber threats or attacks.

To address these and other problems with existing cyber security systems and methods, this disclosure contemplates a framework for automatically and continuously monitoring real world events (e.g., social media postings, crypto currency prices, etc.) for actions that may prompt, cause, or provoke malicious cyber attacks on an organization's computer systems. Once a real-world event is detected that is likely to provoke a cyber attack, the disclosed embodiments automatically adjust device security settings to mitigate the predicted cyber attack and send one or more alerts to notify security personnel about the predicted cyber attack. For example, the disclosed embodiments may monitor a social media feed (e.g., a Twitter feed) of a prominent politician for the mention of a specific country or actor. Once detected, embodiments may proactively adjust device security settings to mitigate the risk of a possible future cyber attack from the identified country or actor. As a specific example, one or more security settings may be automatically adjusted on a network device (e.g., a router) to block network traffic originating from a specific geographic region associated with the identified country or actor (i.e., geoblocking). As a result, the organization's computer systems may be protected from the predicted cyber attack and security personnel may have advanced notice about the predicted cyber attack.

Figure 1:
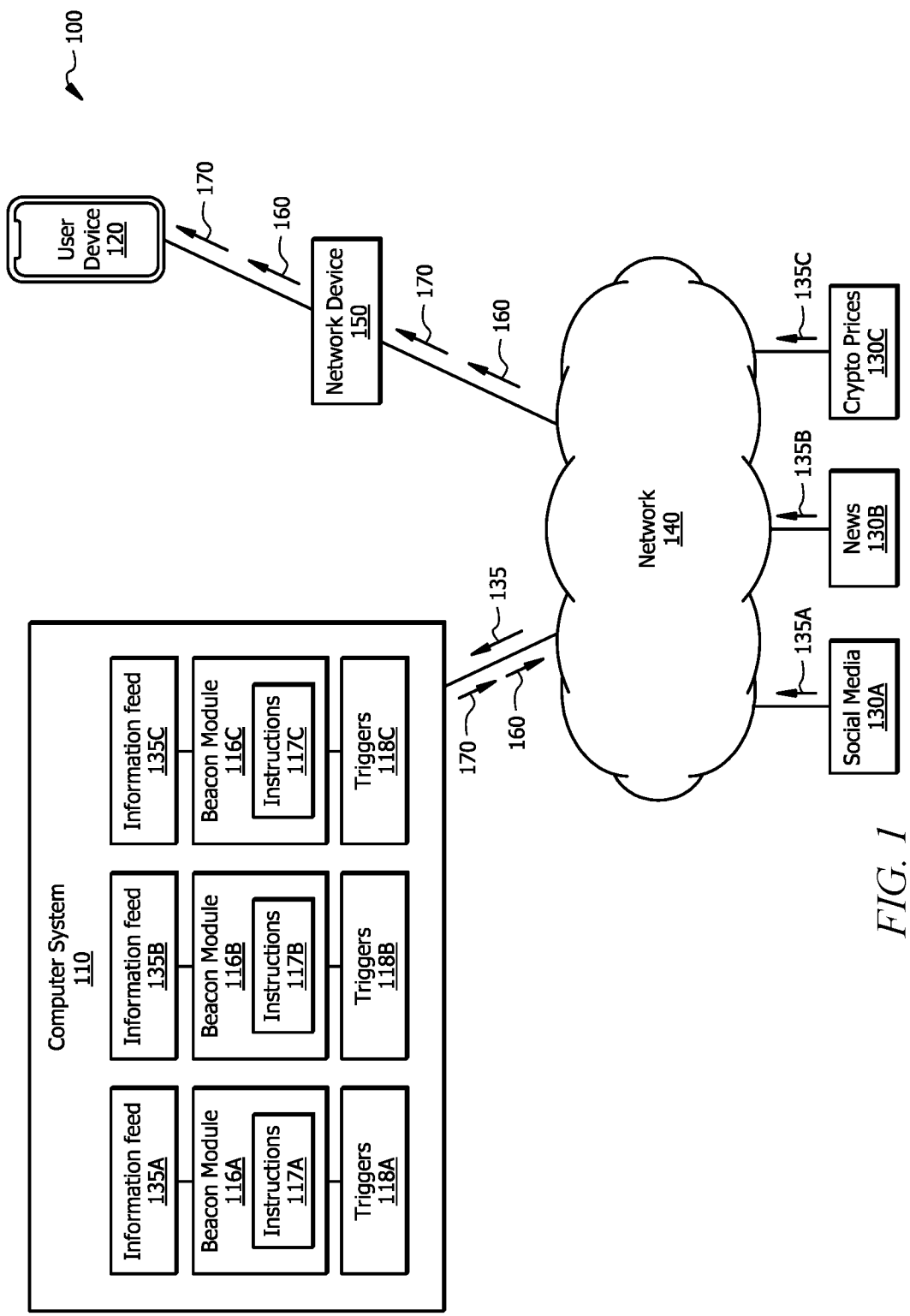
FIG. 1 is a schematic diagram of an example system for cyber threat event prediction and mitigation, according to certain embodiments.
Figure 2:
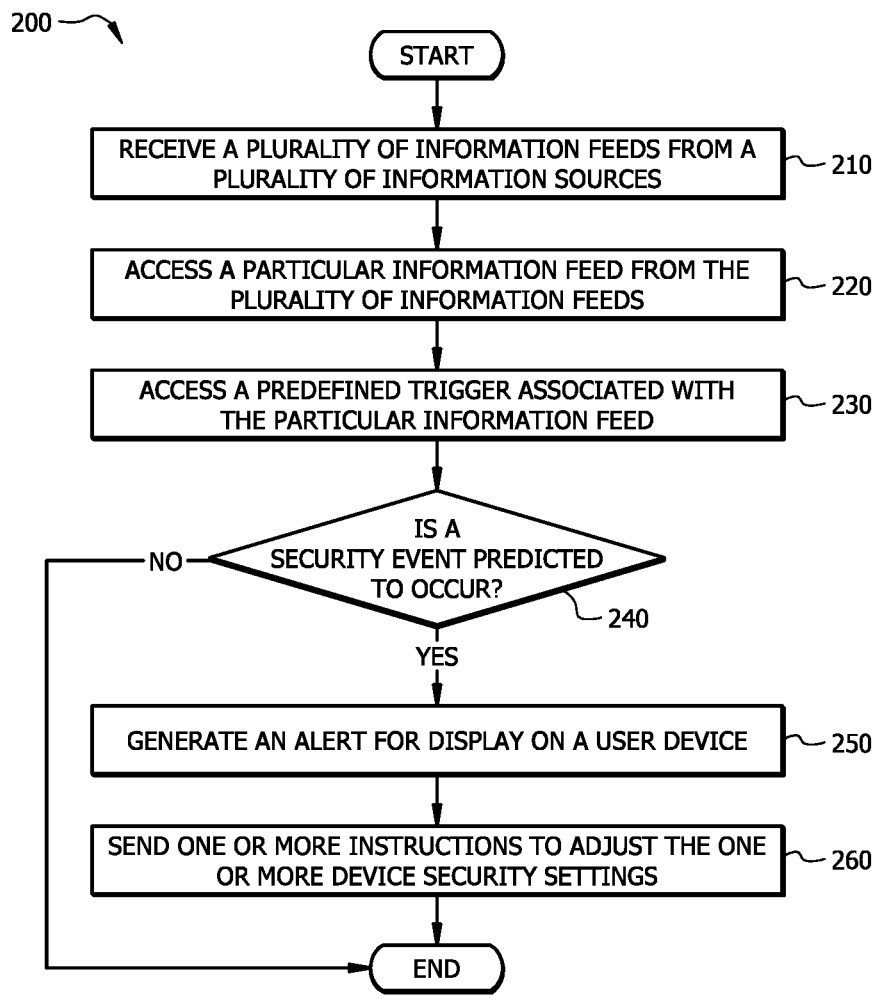
FIG. 2 is a flowchart of a method for cyber threat event prediction and mitigation, according to certain embodiments.
Figure 3:
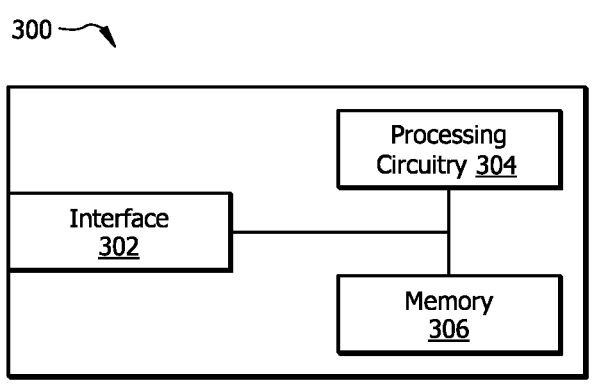
FIG. 3 illustrates an example of computing components, according to certain embodiments.

FIGS. 1 through 3 show example systems and methods for cyber threat event prediction and mitigation. FIG. 1 illustrates an example system for cyber threat event prediction and mitigation. FIG. 2 illustrates an example method for cyber threat event prediction and mitigation. FIG. 3 illustrates an example computer system that may be used by the systems and methods described herein.

FIG. 1 illustrates an example cyber attack prediction and mitigation system 100, according to certain embodiments. Cyber attack prediction and mitigation system 100 includes a computing system 110, a user device 120, multiple information sources 130 (e.g., 130A-C), a network 140, and a network device 150. Computing system 110 is communicatively coupled to information sources 130 and network device 150 via network 140 using any appropriate wired or wireless telecommunication technology. User device 120 is communicatively coupled to computing system 110 via network device 150 using any appropriate wired or wireless telecommunication technology.

In general, computing system 110 monitors information feeds 135 from information sources 130. When a particular trigger 118 (e.g., 118A-C) occurs within an information feed 135, computing system 110 determines that a security event (e.g., a cyber attack) is predicted to occur. In response to a predicted security event, computing system sends an alert 160 for display on user device 120 and provides one or more security settings 170 in order to prevent or mitigate the predicted security event.

Computing system 110 may be any appropriate computing system in any suitable physical form. As example and not by way of limitation, computing system 110 may be an embedded computer system, a system-on-chip (SOC), a single-board computer system (SBC) (such as, for example, a computer-on-module (COM) or system-on-module (SOM)), a desktop computer system, a laptop or notebook computer system, a mainframe, a mesh of computer systems, a mobile telephone, a personal digital assistant (PDA), a server, a tablet computer system, an augmented/virtual reality device, or a combination of two or more of these. Where appropriate, computing system 110 may include one or more computing systems 110; be unitary or distributed; span multiple locations; span multiple machines; span multiple data centers; or reside in a cloud, which may include one or more cloud components in one or more networks. Where appropriate, one or more computing systems 110 may perform without substantial spatial or temporal limitation one or more steps of one or more methods described or illustrated herein. As an example and not by way of limitation, one or more computing systems 110 may perform in real time or in batch mode one or more steps of one or more methods described or illustrated herein. One or more computing systems 110 may perform at different times or at different locations one or more steps of one or more methods described or illustrated herein, where appropriate. In some embodiments, computing system 110 includes an electronic display that may alternately or additionally display alert 160. FIG. 3 illustrates an example computer system that may be used for computing system 110.

Beacon modules 116 (e.g., 116A-C) represent any suitable sets of instructions, logic, or code embodied in a computer-readable storage medium (e.g., memory 306). For example, beacon module 116 may be embodied in memory 306, a disk, a CD, or a flash drive. In particular embodiments, beacon module 116 may include monitoring instructions 117 (e.g., a software application) executable by processor 304 to perform one or more of the functions described herein. In general, each beacon module 116 compares a particular information feed 135 to a corresponding trigger 118 in order to determine if a security event is predicted to occur. If a security event is predicted to occur, beacon module 116 sends alert 160 for display on user device 120 either directly or via network 140 and sends one or more security settings to network device 150 or user device 120 to mitigate or prevent the predicted security event.

Triggers 118 are predetermined criteria that computer systems 110 compares to information feeds 135 in order to determine whether a security event is predicted to occur. As one example, trigger 118A may include a predetermined list of countries, groups, topics, people, etc. that are compared to information within social media feeds 135A. As another example, trigger 118B may include a predetermined list of events, topics, countries, etc. that are compared to information within news feeds 135B. As yet another example, trigger 118C may include a predetermined list of crypto currencies, prices, etc. that are compared to information within crypto currency prices feed 135C. While specific examples of triggers 118 are illustrated herein, other triggers 118 may have any other appropriate criteria that is compared to information feeds 135.

User device 120 is any appropriate device for communicating with components of remote computing system 110 over network 140. For example, user device 120 may be a handheld computing device such as a smartphone, wearable computer glasses, a smartwatch, a tablet computer, a laptop computer, and the like. User device 120 may include an electronic display, a processor such as processor 304, and memory such as memory 306. The electronic display of user device 120 may display alert 160 that is provided by remote computing system 110.

Information sources 130 are any available sources of information that may be used to predict a security event such as a cyber attack. Information sources 130 provide information feeds 135 to cyber attack prediction and mitigation system 100. For example, information sources 130 may include a social media information source 130A, a news information source 130B, and a crypto prices information source 130C. Social media information source 130A may be any social media source such as Twitter, Facebook, etc. that provides social media feeds 135A (e.g., social media posts) to cyber attack prediction and mitigation system 100. News information source 130B may be any local, regional, national, or international new source (e.g., CNN) that provides news feeds 135B (e.g., new stories, news bulletins, etc.) to cyber attack prediction and mitigation system 100. New information source 130B may be accessed online (e.g., via the Internet) or over-the-air broadcast. Crypto prices information source 130C is any source of crypto currency prices feed 135C.

While three specific information sources 130 are illustrated in FIG. 1 and discussed above, this disclosure contemplates any other available information source 130. For example, information sources 130 may include forecasts and security bulletins from a security industry source. As another example, information sources 130 may include an open-source intelligence (OSINT) information intelligence feed.

Network 140 allows communication between and amongst the various components of cyber attack prediction and mitigation system 100. For example, computing system 110, user device 120, information sources 130, and network device 150 may communicate via network 140. This disclosure contemplates network 140 being any suitable network operable to facilitate communication between the components of cyber attack prediction and mitigation system 100. Network 140 may include any interconnecting system capable of transmitting audio, video, signals, data, messages, or any combination of the preceding. Network 140 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication (NFC) network, a Zigbee network, and/or any other suitable network.

Network device 150 receives, creates, stores and/or sends data along a path of network 140. Network device 150 may include one or more endpoints and/or one or more redistribution points that recognizes, processes, and forwards data to other devices such as user device 120. Network device 150 may be a virtual and/or a physical network node. In certain embodiments, network device 150 includes data communications equipment such as a switch, bridge, modem, hub, and the like. In some embodiments, network device 150 is data terminal equipment such as a router or a server. In general, network device 150 may be controlled or otherwise instructed in order to control the flow of data to and from user device 120. For example, one or more security settings on network device 150 may be controlled in order to prohibit traffic to user device 120 from certain geographic regions. As a specific example, one or more security settings on network device 150 may be controlled in order to prohibit network traffic from reaching user device 120 that originates from a certain city, state, or country that is associated with a predicted security event.

Alert 160 is a message or other indication that is displayed on user device 120 regarding a predicted security event. In some embodiments, alert 160 includes one or more of an indication of a predicted security event and a timestamp associated with the predicted security event. For example, alert 160 may be: "Likely cyber attack from Country A detected at 10:20 AM."

Security settings 170 are one or more device instructions, commands, etc. that are sent to either network device 150 or user device 120 in order to mitigate or prevent a predicted security event. As a specific example, security settings 170 may be commands that are automatically sent to network device 150 to block network traffic originating from a specific geographic region (i.e., geoblocking). As another example, security settings 170 may be commands sent to network device 150 to start a denial-of-service (DOS) preventative operation on network device 150 or to increase a security level of the DOS preventative operation. As yet another example, security settings 170 may be instructions sent to user device 120 to increase the sensitivity of an end-point detection solution running on user device 120. For example, an end-point detection application may be running on user device 120 to monitor and collect activity data from endpoints that could indicate a threat, analyze data to identify threat patterns, automatically respond to identified threats to remove or contain the threats, and to send alerts about the threats.

In operation, cyber attack prediction and mitigation system 100 automatically and continuously monitors information sources 130 for real world events that may prompt, cause, or provoke malicious security events such as cyber attacks on an organization's computer systems. Once a real-world event is detected in information sources 130 that is likely to provoke a cyber attack, cyber attack prediction and mitigation system 100 automatically adjusts device security settings on a device such as network device 150 or user device 120 in order to mitigate the predicted cyber attack. In addition, cyber attack prediction and mitigation system 100 may display or send one or more alerts 160 to notify security personnel about the predicted cyber attack.

In order to determine whether a security event is predicted to occur, beacon module 116 compares triggers 118 to information feeds 135. As one example, beacon module 116A may compare a predetermined list of countries, groups, topics, and people within trigger 118A to information within social media feed 135A. As another example, beacon module 116B may compare a predetermined list of crypto currencies and prices within trigger 118C to information within crypto currency prices feed 135C. Once a match between a particular trigger 118 and a corresponding information feed 135 has been identified by beacon module 116 (e.g., one or more words of the information feed 135 match one or more words of the particular trigger 118), beacon module 116 may then determine security settings 170 associated with the particular trigger 118. For example, if a particular country listed in trigger 118A matches a particular social media feed 135A (e.g., a Twitter feed of a politician), beacon module 116 may determine specific security settings 170 to block network traffic originating from the particular country. As another example, if a particular crypto currency listed in trigger 118C increases in price by a predetermined amount listed in trigger 118C, beacon module 116 may determine that crypto currency phishing schemes may increase and therefore generate and transmit security settings 170 to user device 120 in order to increase the sensitivity of an end-point detection solution running on user device 120.

In some embodiments, cyber attack prediction and mitigation system 100 determines an Advanced Persistent Threat (APT) associated with a predictive security event. In general, an APT is a known threat actor such as a nation state or state-sponsored group that has previously enacted a cyber attack on one or more organizations. Cyber attack prediction and mitigation system 100 may consult a list of APTs when determining security settings 170 to use to mitigate or prevent a future security event. Continuing an example from above, if a particular country listed in trigger 118A matches a particular social media feed 135A (e.g., a Twitter feed of a politician), beacon module 116A may consult an APT list to determine specific APTs associated with the particular country. Once one or more APTs are identified, beacon module 116A may then determine one or more geographic regions associated with the identified APTs and then send security settings 170 to block network traffic originating from the determined one or more geographic regions.

As a specific use example for illustrative purposes only, cyber attack prediction and mitigation system 100 may monitor a social media feed 135A within social media information source 130A (e.g., a Twitter feed) of a prominent politician for the mention of a specific country or actor. More specifically, beacon module 116A may monitor social media feed 135A of a prominent politician of Country A (e.g., the president) for a specific trigger 118A (e.g., the mention of Country B or Person B). Once trigger 118A is detected within social media feed 135A, beacon module 116A may determine that a cyber attack is likely from Country B or Person B (or a group associated with Country B or Person B) and then proactively provide security settings 170 to network device 150 or user device 120 to mitigate the risk of the possible future cyber attack. The security settings 170 may be sent, for example, to network device 150 (e.g., a router) in order to block future network traffic originating from a specific geographic region associated with Country B or Person B (i.e., geoblocking). In addition, beacon module 116 may provide alert 160 for display on user device 120 regarding the predicted future cyber attack (e.g., "Possible cyber attack from Country B.") As a result, the organization's computer systems may be protected from the predicted cyber attack and security personnel may have advanced notice about the predicted cyber attack.

As another specific use example for illustrative purposes only, cyber attack prediction and mitigation system 100 may monitor crypto currency prices feed 135C from crypto prices information source 130C for an increase in price of a certain crypto currency. More specifically, beacon module 116C may monitor crypto currency prices feed 135C for a specific trigger 118C (e.g., the increase in price of a particular crypto currency that is above a predetermined amount). Once trigger 118C is detected within crypto currency prices feed 135C, beacon module 116C may determine that a security event is likely to occur and then proactively provide security settings 170 to network device 150 or user device 120 to mitigate the risk of the possible future cyber attack. For example, the predicted security event may be that bad actors may implement phishing or other schemes to attempt to steal the particular crypto currency, and the security settings 170 may be sent to user device 120 to increase the sensitivity of an end-point detection solution running on the user device 120 (e.g., increase the sensitivity of the detection of phishing attacks, turn on multi-factor authentication, etc.). In addition, beacon module 116C may provide alert 160 for display on user device 120 regarding the predicted future cyber attack (e.g., "Possible increase in phishing for crypto currency A."). As a result, the organization's computer systems may be protected from the predicted security event and security personnel may have advanced notice about the predicted security event.

In some embodiments, cyber attack prediction and mitigation system 100 may send, after a predetermined amount of time, one or more additional instructions to adjust security settings 170 back to a previous setting. For example, if cyber attack prediction and mitigation system 100 sends security settings 170 to network device 150 in order to block network traffic from a certain geographic region, cyber attack prediction and mitigation system 100 may send additional security settings 170 to network device 150 after a certain amount of time has passed in order to unblock network traffic from the certain geographic region. As a specific example, network traffic may be blocked from a certain country for three days, after which network traffic may again be permitted from the country.

FIG. 2 shows an example method 200 for cyber threat event prediction and mitigation, according to certain embodiments. Method 200 begins at operation 210. At operation 210, method 200 receives a plurality of information feeds from a plurality of information sources. In some embodiments, the information feeds are information feeds 135 and the information sources are information sources 130.

At operation 220, method 200 accesses a particular information feed from a plurality of information feeds. For example, method 200 may access a social media information feed such as social media information feed 135A. At operation 230, method 200 accesses a particular predefined trigger associated with the particular information feed. In some embodiments, the particular predefined trigger is a particular trigger 118.

At operation 240, method 200 determines whether a security event is predicted to occur by comparing the particular information feed of operation 210 with the particular predefined trigger of operation 220. If method 200 determines in operation 240 that a security event is predicted to occur, method 200 proceeds to operation 250. Otherwise, method 200 may end.

At operation 250, method 200 generates an alert for display on a user device. In some embodiments, the alert is alert 160. In some embodiments, the user device is user device 120.

At operation 260, method 200 sends, over a communications network such as network 140, one or more instructions to adjust one or more device security settings. In some embodiments, the device security settings are security settings 170. In some embodiments, the security settings are instructions to start a denial-of-service preventative operation on a network device or to increase a security level of the denial-of-service preventative operation on the network device. In some embodiments, the security settings are instructions to start or adjust a geoblocking service on the network device that prevents network traffic from one or more geographic regions. In some embodiments, the security settings are instructions to increase a sensitivity level of a detection service running on a user device. In some embodiments, the device security settings are sent to a network device such as network device 150. In other embodiments, the device security settings are sent to a user device such as user device 120. After operation 260, method 200 may end.

In some embodiments, operation 260 may be an optional operation. In such embodiments, method 200 may send an alert in operation 250 to a user to perform an action instead of adjusting the one or more device security settings in operation 250. For example, a security team may be instructed to adjust staffing schedules (e.g., cancel any annual leave or discretionary absences) due to a predicted need for maximum staff levels to respond to the security event that is predicted to occur.

FIG. 3 illustrates an example of computing components 300, in accordance with certain embodiments. The computing components 300 may be used to implement any of the structures illustrated in FIG. 1, or one or more portions thereof, such as network 140, user device 120, computing system 110, and/or network device 150. The computing components 300 may comprise any suitable hardware and/or software configured to perform the functionality described above. The computing components 300 may be implemented using shared hardware or separate hardware. In certain embodiments, computing components 300 may be distributed in a cloud network environment.

In certain embodiments, the components comprise one or more interface(s) 302, processing circuitry 304, and/or memory(ies) 306. In general, processing circuitry 304 controls the operation and administration of a structure by processing information received from memory 306 and/or interface 302. Memory 306 stores, either permanently or temporarily, data or other information processed by processing circuitry 304 or received from interface 302. Interface 302 receives input, sends output, processes the input and/or output and/or performs other suitable operations. An interface 302 may comprise hardware and/or software.

Examples of interfaces 302 include user interfaces, network interfaces, and internal interfaces. Examples of user interfaces include one or more graphical user interfaces (GUIs), buttons, microphones, speakers, cameras, and so on. Network interfaces receive information from or transmit information through a network, perform processing of information, communicate with other devices, or any combination of the preceding. Network interfaces may comprise any port or connection, real or virtual, wired or wireless, including any suitable hardware and/or software, including protocol conversion and data processing capabilities, to communicate through a LAN, WAN, or other communication system that allows processing circuitry 304 to exchange information with or through a network. Internal interfaces receive and transmit information among internal components of a structure.

Processing circuitry 304 communicatively couples to interface(s) 302 and memory 306, and includes any hardware and/or software that operates to control and process information. Processing circuitry 304 may include a programmable logic device, a microcontroller, a microprocessor, any suitable processing device, or any suitable combination of the preceding. Processing circuitry 304 may execute logic stored in memory 306. The logic is configured to perform functionality described herein. In certain embodiments, the logic is configured to perform the method described with respect to FIG. 2.

Memory 306 includes any one or a combination of volatile or non-volatile local or remote devices suitable for storing information. For example, memory comprises any suitable non-transitory computer readable medium, such as Read Only Memory ("ROM"), Random Access Memory ("RAM"), magnetic storage devices, optical storage devices, or any other suitable information storage device or a combination of these devices. Memory 306 may be local/integrated with the hardware used by processing circuitry 304 and/or remote/external to the hardware used by processing circuitry 304.

The scope of this disclosure is not limited to the example embodiments described or illustrated herein. The scope of this disclosure encompasses all changes, substitutions, variations, alterations, and modifications to the example embodiments described or illustrated herein that a person having ordinary skill in the art would comprehend.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

Modifications, additions, or omissions may be made to the methods described herein without departing from the scope of the disclosure. The methods may include more, fewer, or other steps. Additionally, steps may be performed in any suitable order. That is, the steps of any method disclosed herein do not have to be performed in the exact order disclosed, unless explicitly stated.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or." All references to "a/an/the element, apparatus, component, means, step, etc." are to be interpreted openly as referring to at least one instance of the element, apparatus, component, means, step, etc., unless explicitly stated otherwise.

Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although several embodiments have been illustrated and described in detail, it will be recognized that substitutions and alterations are possible without departing from the spirit and scope of the present disclosure, as defined by the appended claims.

The invention claimed is:

1. A system for automatically adjusting one or more device security settings, the system comprising:
   a memory configured to store:
      a plurality of information feeds received over a communications network from a plurality of information sources, the plurality of information sources comprising:
         a social media source;
         a news source; or
         a crypto currency price source; and
      a plurality of predefined triggers, each predefined trigger comprising criteria for evaluating one or more of the plurality of information feeds for possible security events; and
   a processor communicatively coupled to the memory, the processor configured to:
      access a particular information feed from the plurality of information feeds;
      access a particular predefined trigger associated with the particular information feed;
      determine, by comparing the particular information feed with criteria of the particular predefined trigger, whether a security event is predicted to occur; and
      when the security event is predicted to occur:
         generate an alert for display on a user device; and
         send, over the communications network, one or more instructions to adjust the one or more device security settings in order to prevent or mitigate the predicted security event, the one or more device security settings operable to:
  start a denial-of-service preventative operation on a network device;
  increase a security level of the denial-of-service preventative operation on the network device;
  start or adjust a geoblocking service on the network device the geoblocking service operable to prevent network traffic from one or more geographic regions; and
  increase a sensitivity level of a detection service running on the user device, wherein increasing the sensitivity level of the detection service running on the user device comprises increasing a sensitivity of detection of phishing attacks and turning on a multi-factor authentication.

2. The system of claim 1, wherein:
the processor is further configured to:
  determine an Advanced Persistent Threat (APT) associated with the predicted security event; and
  determine a particular geographic region associated with the determined APT; and
the geoblocking service on the network device is adjusted to prevent network traffic from the particular geographic region.

3. The system of claim 1, wherein the processor is further configured to send, after a predetermined amount of time, one or more additional instructions to adjust the one or more device security settings back to a previous setting.

4. A system for automatically adjusting one or more device security settings, the system comprising:
  a memory configured to store:
    a plurality of information feeds received over a communications network from a plurality of information sources; and
    a plurality of predefined triggers, each predefined trigger comprising criteria for evaluating one or more of the plurality of information feeds for possible security events; and
  a processor communicatively coupled to the memory, the processor configured to:
    access a particular information feed from the plurality of information feeds;
    access a particular predefined trigger associated with the particular information feed;
    determine, by comparing the particular information feed with criteria of the particular predefined trigger, whether a security event is predicted to occur; and
    when the security event is predicted to occur:
      generate an alert for display on a user device; and
      send, over the communications network, one or more instructions to adjust the one or more device security settings in order to prevent or mitigate the predicted security event, wherein the one or more instructions to adjust the one or more device security settings are sent to a user device, the one or more instructions operable to increase a sensitivity level of a detection service running on the user device, wherein increasing the sensitivity level of the detection service running on the user device comprises increasing a sensitivity of detection of phishing attacks and turning on a multi-factor authentication.

5. The system of claim 4, wherein the plurality of information sources comprises:
a social media source;
a news source; and
a crypto currency price source.

6. The system of claim 4, wherein the one or more instructions are sent over the communications network to a network device, the one or more device security settings operable to start a denial-of-service preventative operation on the network device.

7. The system of claim 4, wherein the one or more instructions are sent over the communications network to a network device, the one or more device security settings operable to increase a security level of a denial-of-service preventative operation on the network device.

8. The system of claim 4, wherein the one or more instructions are sent over the communications network to a network device, the one or more device security settings operable to start or adjust a geoblocking service on the network device, the geoblocking service operable to prevent network traffic from one or more geographic regions.

9. The system of claim 8, wherein:
the processor is further configured to:
  determine an Advanced Persistent Threat (APT) associated with the predicted security event; and
  determine a particular geographic region associated with the determined APT; and
the geoblocking service on the network device is adjusted to prevent network traffic from the particular geographic region.

10. The system of claim 4, wherein the processor is further configured to send, after a predetermined amount of time, one or more additional instructions to adjust the one or more device security settings back to a previous setting.

11. A method for automatically adjusting one or more device security settings, the method comprising:
  receiving a plurality of information feeds over a communications network from a plurality of information sources;
  accessing a particular information feed from the plurality of information feeds;
  accessing a predefined trigger associated with the particular information feed, each predefined trigger comprising criteria for evaluating one or more of the plurality of information feeds for possible security events;
  determining, by comparing the particular information feed with criteria of the particular predefined trigger, whether a security event is predicted to occur; and
  when the security event is predicted to occur:
    generating an alert for display on a user device; and
    sending, over the communications network, one or more instructions to adjust the one or more device security settings in order to prevent or mitigate the predicted security event, wherein the one or more instructions to adjust the one or more device security settings are sent to a user device, the one or more instructions operable to increase a sensitivity level of a detection service running on the user device, wherein increasing the sensitivity level of the detection service running on the user device comprises increasing a sensitivity of detection of phishing attacks and turning on a multi-factor authentication.

12. The method of claim 11, wherein the plurality of information sources comprises:
a social media source;
a news source; and
a crypto currency price source.

13. The method of claim 11, wherein the one or more instructions are sent over the communications network to a network device, the one or more device security settings operable to start a denial-of-service preventative operation on the network device.

14. The method of claim 11, wherein the one or more instructions are sent over the communications network to a network device, the one or more device security settings operable to increase a security level of a denial-of-service preventative operation on the network device.

15. The method of claim 11, wherein the one or more instructions are sent over the communications network to a network device, the one or more device security settings operable to start or adjust a geoblocking service on the network device, the geoblocking service operable to prevent network traffic from one or more geographic regions.

16. The method of claim 15, wherein:
   the method further comprises:
      determining an Advanced Persistent Threat (APT) associated with the predicted security event; and
      determining a particular geographic region associated with the determined APT; and
   the geoblocking service on the network device is adjusted to prevent network traffic from the particular geographic region.

17. The method of claim 11, further comprising sending, after a predetermined amount of time, one or more additional instructions to adjust the one or more device security settings back to a previous setting.

\* \* \* \* \*